United States Patent [19]

Neal et al.

[11] E Re. 31,605

[45] Reissued Jun. 19, 1984

[54] METHOD AND APPARATUS FOR ELECTROCHEMICALLY FINISHING AIRFOIL EDGES

[75] Inventors: James W. Neal, Columbia; Joseph F. Loersch, Bolton; Robert G. Adinolfi, Manchester, all of Conn.

[73] Assignee: United Technologies Corporation, Hartford, Conn.

[21] Appl. No.: 405,858

[22] Filed: Aug. 6, 1982

Related U.S. Patent Documents

Reissue of:

[64] Patent No.: 4,217,190
Issued: Aug. 12, 1980
Appl. No.: 50,388
Filed: Jun. 20, 1979

[51] Int. Cl.[3] ..... C25F 3/14; B23P 1/04; B23P 1/14; B23P 1/20

[52] U.S. Cl. ..... 204/129.35; 204/129.5; 204/224 M

[58] Field of Search ..... 204/129.25, 129.35, 204/129.5, 129.55, 129.6, 224 M

[56] References Cited

U.S. PATENT DOCUMENTS

| | | | |
|---|---|---|---|
| 3,459,645 | 8/1969 | Wilson | 204/129.5 |
| 3,816,272 | 6/1974 | Joslin | 204/129.35 |
| 3,849,273 | 11/1974 | Johnson | 204/129.6 |
| 3,970,538 | 7/1976 | Lucas | 204/224 M |

*Primary Examiner*—T. M. Tufariello
*Attorney, Agent, or Firm*—C. G. Nessler

[57] ABSTRACT

Disclosed is apparatus and method for electrochemically finishing the edges of airfoils and other thin edged objects. When the edge on an airfoil varies in thickness along its length, a tapered electrode is provided which has both a decreased diameter and increased spacing distance, providing a means for obtaining an edge with a radius proportioned to the thickness. Generally, in the system having an electrode with a unit surface area A, and with an electrode-workpiece surface spacing distance S, both A and S are changed so that the ratio A/S is lowered for electrode portions proximate to edge portions having lowered thickness.

5 Claims, 7 Drawing Figures

FIG. 1
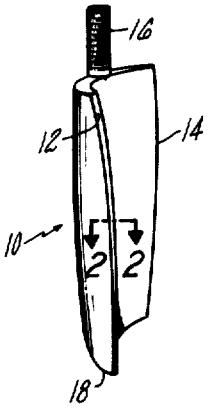
FIG. 2
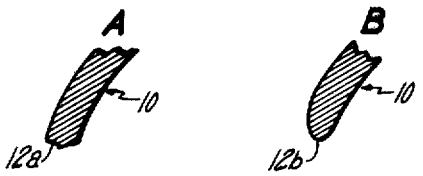
FIG. 3
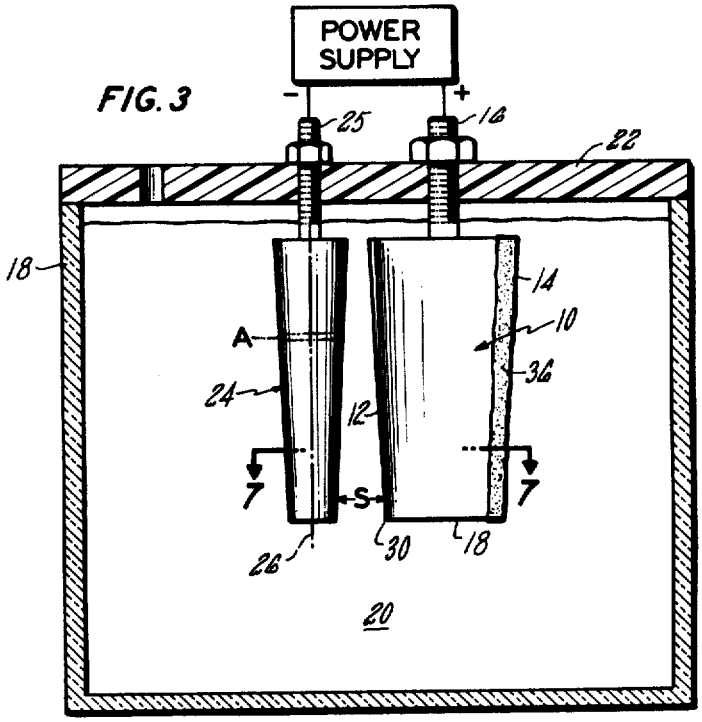
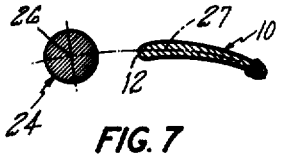
FIG. 7
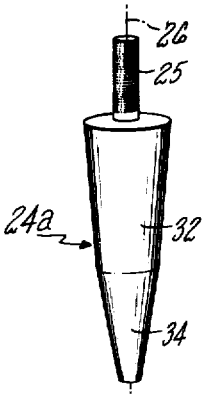
FIG. 4
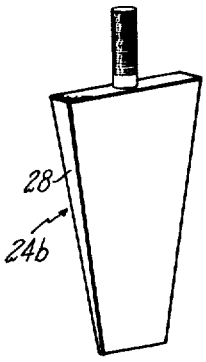
FIG. 5
FIG. 6
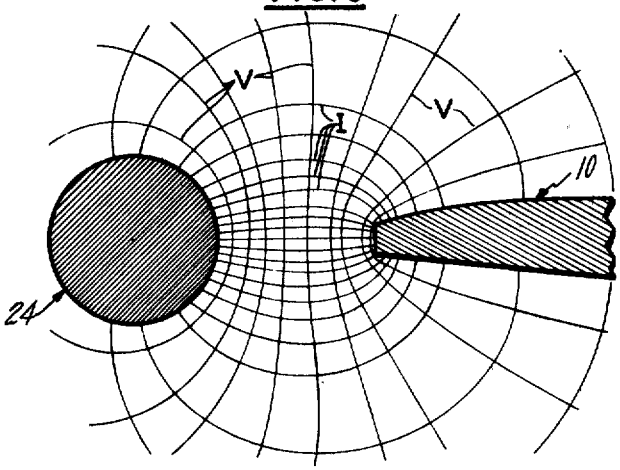

METHOD AND APPARATUS FOR ELECTROCHEMICALLY FINISHING AIRFOIL EDGES

Matter enclosed in heavy brackets [ ] appears in the original patent but forms no part of this reissue specification; matter printed in italics indicates the additions made by reissue.

BACKGROUND OF THE INVENTION

1. The present invention is related to the field of electrochemistry, particularly electrochemical milling and finishing of metal parts, such as gas turbine airfoils.

2. Electrochemical milling is well known and comprises the removal of material from the surface of a metal piece by the application of an electrical potential in the presence of a conductive electrolyte. The process is particularly well suited to imparting a smooth finish to parts having surface irregularities. Exemplary components adapted to being finished by electrochemical milling are precision forged titanium airfoils used in gas turbines. While such parts are often in the whole forged to nearly their final dimension, it is quite typical that the leading and trailing edges will have a sheared flashing stub characteristic of forgings made in closed parting dies. For use in gas turbines, it is required that the airfoils have a rounded and very smooth edge and therefore electrochemical processes have been applied to this end in finishing forgings and other similar parts.

Johnson, U.S. Pat. No. 3,849,273, describes a method and apparatus for radiusing the edge of an airfoil using a hollow electrode through which electrolyte is flowed toward the edge. The electrode is of an arbitrary area and size. Generally, the electrode presents a planar surface to the workpiece edge, the planar surface being perpendicular to the direction of current and electrolyte flow. When it is desired to produce a constantly varying radius along the blade edge, as is required when the thickness of the airfoil varies along its length, it is said that the distance between the edge and the nearest electrode point should be proportioned to the amount of material to be removed locally from the airfoil edge. Consequently, relatively precise control of the spacing between the electrode and the edge is required; this is made particularly difficult in view of the forces caused by the rapidly flowing electrolyte, as well as complications produced when the airfoil has a great deal of twist and the edge is a continuously varying curve.

Lucas, U.S. Pat. No. 3,970,538, describes another approach to finishing of airfoil edges, wherein a split cylindrical tube captures the edge of the airfoil and functions as the electrode. Thus, the electrode is quite closely positioned to the airfoil and the slot in the body of the tool casing must match the shape of the blade being milled. Further, given the particular shape and proximity of the electrode to the airfoil, it is possible that the current flow and resultant material removal might be unacceptably localized, to the extent that a step is formed in the airfoil surface, away from the edge where the electrochemical action is abruptly terminated by the tool configuration.

From the foregoing, it is evident that it has been previously recognized that the simple connection of an arbitrary electrode in an electrical circuit in proximity to an airfoil edge will not desirably finish the edge. But, the solutions of Johnson and Lucas and like inventions require precision machined electrodes specific for each part, or careful and strongly rigid fixturing to maintain precise location between the electrode and the workpiece. There is a need for readily removing material from airfoil edges by a method which requires less criticality in positioning and which lessens the difficulty of formulating and constructing electrodes.

SUMMARY OF THE INVENTION

An object of the invention is to provide an improved means for electrochemical milling of the edges of turbine blades, particularly to provide an apparatus and method capable of finishing a variety of different sized airfoils and workpieces without undue cost in fabricating electrodes and complexity in fixturing. It is a further object to provide an improved process wherein small variations in electrode and airfoil positioning are less consequential, and wherein small variations in the workpiece are similarly accommodated.

According to the invention, electrochemical milling of the edge of a workpiece is characterized by the provision of a shaped electrode, such as a tapered electrode, which has both a surface area and spacing distance from the edge which vary according to the amount of material to be removed from the workpiece. In a preferred embodiment, the electrode-cathode has a shape of a tapered cone and it is mounted in proximity to the edge. Thus, in the vicinity of lesser edge thickness, the electrode will have both a greater spacing, insofar as the distance between the edge and electrode surface is concerned, and a lesser area from which electric current may flow. When a uniform electric potential is applied between the electrode and the workpiece, the invention will result in a more or less uniform current density along the workpiece edge. Consequently, the material removed will be proportioned more or less to the area, and as required for a good final part, a greater quantity of material will be removed from the thicker portion of the edge than from the thinner portion.

Generally stated, both the unit surface area A of the electrode and the distance S between the electrode and the workpiece are varied so that the ratio A/S is lowered where less mass of material is to be removed.

A feature of the invention is that an electrode can be relatively easily constructed or modified to adapt to different part configurations. Further, since the current density is controllable by the combination of electrode surface area and spacing distance, the spacing distance becomes less critical by itself, insofar as affecting the material removed. This desirably reduces the need for high precision in fixturing.

The invention has the advantage that the production of electrodes is low in cost; the apparatus is relatively simple and parts are easily interchanged when a number of components are being processed; and, common materials of construction and conventional electrolytes and power supplies are usable.

BRIEF DESCRIPTION OF THE DRAWINGS

FIG. 1 shows a typical airfoil workpiece;

FIG. 2 shows partial cross sections of the unfinished and finished edges of the workpiece of FIG. 1;

FIG. 3 is a general view of the electrochemical milling apparatus;

FIG. 4 shows an electrode with a compound taper;

FIG. 5 shows an alternate embodiment electrode;

FIG. 6 schematically illustrates the distribution of electric potential and current flow between an electrode and workpiece; and FIG. 7 partially illustrates the planar positioning of the electrode and workpiece, as a section through 7—7 of FIG. 3.

DESCRIPTION OF THE PREFERRED EMBODIMENT

The preferred embodiment is described in terms of the electrochemical milling of titanium airfoils, such as illustrated in FIG. 1. However, those skilled in the art will recognize that the invention is adaptable to other workpiece configurations and other workpiece materials.

FIG. 1 illustrates a representative forged titanium airfoil 10 having a leading edge 12 and a trailing edge 14. A shank 16 is usable for mounting and gripping the airfoil. It will be noted that the leading edge decreases in thickness from the shank end to the tip 18, as does the body of the airfoil. FIG. 2 illustrates representative cross sections of leading edges; FIG. 2A indicates a leading edge 12a in its unfinished condition, showing the sheared remains of a forging flashing; FIG. 2B illustrates a finished leading edge 12b which is desired and which will be achieved through the operation of the invention herein. Since the thickness of the leading edge varies along the length of the edge, it should be evident that to get a smooth radius and finish along the edge, more material by weight and volume, will have to be removed from the thicker portion than the thinner portion of the edge. (In other workpieces, it may be desired to remove from a constant thickness edge more material in one region than in another for special purposes. The invention will be seen to be readily applicable to such situation.)

FIG. 3 shows the apparatus used in practice of the invention. Contained within a non-conductive vessel 18 is electrolyte 20; a non-conductive support 22 is fixed in position upon the vessel. The airfoil 10 is positioned fixedly within a conductive liquid electrolyte by the mounting of the shank 16 in a hole in the support 22. In similar fashion, an electrode 24 is positioned in proximity to the airfoil by its shank 25. Masking material 36 is selectively applied to the workpiece to prevent any unwanted etching remote from the edge being finished. Areas normally masked will be the shank or portions of the airfoil in the vicinity of the opposing edge 14. In the preferred use of the invention, masking is not applied to the body of the airfoil in vicinity of the edge 12 since this would tend to cause an etched step discontinuity in the airfoil.

The electrode is made of stainless steel, copper, carbon or other material familiar to the art which is unreactive with the electrolyte. While not entirely evident from the FIG. 3, the electrode principal axis 26 is approximately aligned with the leading edge 12. The positioning is more apparent from FIG. 7. The electrode principal axis 26 is approximately equidistant from the edge 12 of the airfoil, and the axis 26 lies approximately along the extension of the mean line 27 of the airfoil cross section. Thus, if the airfoil has a twist in its shape, the electrode will be skewed with respect to the longitudinal axis of the blade. The foregoing positioning is preferred for a symmetrically shaped edge. The electrode may be positioned off of the extended mean line if a non-symmetrical contour is desired on the leading edge.

The electrode has a tapered cylindrical shape, wherein the portion of the electrode having the lesser diameter is positioned at the end of the airfoil having the edge with the lesser thickness. By virtue of the electrode having a taper, the spacing distance ("S" in FIG. 3) between the surface of the electrode and the leading edge is increased as the thickness of the leading edge decreases along the length of the airfoil. In like fashion, the unit surface area ("A" in FIG. 3) of the electrode decreases along the length of the electrode.

Connecting the electrode and the airfoil is a power supply suited for providing electric potential necessary to accomplish electrochemical milling. As shown, the workpiece is anodic and electrode is cathodic.

In operation, the electric potential is applied at a sufficient level and duration to obtain the desired metal removal. The current flow at points along the edge will be influenced by the spacing and area of the proximate electrode portion. The amount of material removed from a portion of the workpiece will be proportionate to the quantity of electricity passed through it, according to the well-known Faraday law. The electrode and workpieces, being good conductors of electricity, will desirably have constant electric potentials along their entire lengths. Therefore, the change in potential gradient per unit distance within the electrolyte will be less where the spacing distance between the electrode and the workpiece is greater, and the current flow will be less. Thus, the workpiece dissolution or rate of electrochemical milling will be inversely proportional to the spacing between the cathode and anode. Further, where the electrode diameter is reduced, there will be less surface area, and thus a tendency for the current density to rise. But countering this tendency will be resultant effects at the electrode surface and within the electrolyte, such as gas polarization. The net result is that current flow will be less from smaller diameter portions of the electrode. Consequently, the combined effects of the spacing distance increase and diameter decrease are to reduce the current flow at the thinner sections of the airfoil edge and thereby reduce the mass of material removed. Thus, the resultant radius will be proportioned to the edge thickness without excess removal of material from the thinner portions.

In the preferred practice of the invention, it is sought to obtain a relatively uniform current density along the length of the airfoil edge 12. Of course, evaluating this is somewhat complex inasmuch as current is flowing to other areas adjacent the edge. This is illustrated by FIG. 6, in which is shown a cross sectional view of the electrode and workpiece as configured in FIG. 3. In FIG. 6 the unit electric potential gradient which exists between the electrode and workpiece is represented schematically by the lines marked with "V"; the unit current flow is represented by the lines marked "I." It can be seen that the current density is highest between the leading edge of the workpiece and the portion of the electrode nearest the workpiece. Also, current flows, in diminished intensity due to the longer path through the electolyte, to other regions of the electrode. But, the current tends to concentrate on the sharp edges of the workpiece, thereby causing the desired rounding of the leading edge. The electric potential gradients, and the current densities attending them, can be analyzed by modeling, in two dimensions, the cell and electrode cross sections on resistance paper. An EMF is applied to the electrodes thereby initiating a "potential field" between them that can be resolved and plotted. Alternatively, the desired electrode configuration can be determined experimentally by repetitively altering or reconfiguring the electrode until the desired uniformity is achieved, as measured by the results on test airfoils.

Some further observations can be made on the general mode of construction and operation of the tapered electrode. Since it is desired to concentrate the current at the leading edge, and not have substantial current run to the other parts of the airfoil body, the major diameter of the electrode must not be too great with respect to the thickness of the edge; we have found that a ratio of about 10 to 1 is satisfactory.

As it is the change in spacing distance between the electrode surface and the workpiece edge which contributes to the reduction in current, the major diameter of the electrode is preferably placed in close proximity to the edge. If the entire electrode is located at a too great a distance from the edge, then of course the relative change in spacing distance will be less, and the desired variation in current may not be obtained. On the other hand, the electrode cannot be placed too close to the workpiece because contact and arcing may occur. Taking these considerations into account, we have found that a minimum spacing of about 1.2 mm at the major diameter is satisfactory. The electrode is tapered to achieve the variation in material removal which is desired. We have found that the desired change in diameter is that which is more or less in direct proportion to the change in thickness of the edge. Of course, since the change in diameter of the electrode produces both a decreased area, proportionate to the change in diameter, and a change in distance, the combined effect of both factors will be greater than the change in edge thickness. This is reflective of the complexity of the situation, and we do not mean to suggest that a rigorous formula or analysis can be set forth at this time.

There is a further consideration in establishing the diameters of the electrode and that is the electrode's capacity to pass current through its cross sectional body and from its surface into the electrolyte. As the diameter is decreased, the unit surface area of the electrode is decreased. If the surface area is inadequate for the current which is created by the applied electric potential, then heating of the electrode can take place and more importantly, excess generation of gas may occur. And ultimately "burning" and loss of material from the electrode will result. That the body cross section must be adequate to carry current throughout the electrode length without undue heating and voltage drop is rather evident. Thus, it should be seen that there will be instances in which the absolute diameters of the electrode must be kept above certain levels notwithstanding other criteria. Another factor which is to be considered is the passivation which occurs, particularly in titanium, at the workpiece if the current density is not above a particular threshold value. Thus, the minimum diameter and spacing of the electrode would be necessarily maintained above that value which reduced the current density to the point where passivation occurred at the workpiece.

With more complicated shapes of workpiece, it will be desirable to refine the electrode further. As a relatively simple example, the airfoil and electrode arrangement shown in FIG. 3 may result in excessive material being removed from the point 30 at which the leading edge 12 intersects the tip 18 of the airfoil. In such a case, it will be found useful to use a compound taper electrode of the type shown in FIG. 4. The first and predominate portion of the electrode has a taper according to the principles set forth above, while the second portion 34 has a more severe taper, thereby increasing more the spacing distance and decreasing more the surface area. This will result in a further reduction in current in the vicinity of the tip-edge intersection 30. The exact point at which the compound taper is initiated along the axis 26 of the electrode is a matter of experiment with particular shapes of workpieces. In another instance, such as where the airfoil has a platform, it may be found desirable to increase the surface area of the electrode and decrease the spacing distance in the vicinity, so that current is caused to flow into the corner to which it is naturally adverse. Accordingly, it will be understood that our invention contemplates more varied changes in electrode configuration than the examples given in this, the preferred embodiment. For example, in the practice of the invention it is possible to have an electrode which first decreases, then increases, and then again decreases in diameter and spacing, or to have interspersed straight sections.

As described above, the shape and spacing of the electrode are interrelated. In fact, with a tapered cylindrical electrode of the type shown in FIGS. 3 and 4, the relation is constrained. In certain instances, other shapes of electrodes may also be used. For example, FIG. 5 shows a trapezoidal-shaped electrode in which the electrode spacing and electrode area may be independently varied when the face 28 is presented to the workpiece. Other configurations will present themselves to a skilled person practicing the invention. The exact relationship between the change in area and the degree to which the spacing distance is increased is a matter of experiment to obtain the exact results desired. But, for the tapered cylindrical electrode we have found that the change in unit area of the electrode should be more or less proportioned according to the change in thickness of the leading edge of an airfoil; this is further described by way of example below.

The following describes the practice of the invention in the finishing of a gas turbine blade, of the titanium alloy AMS 4928 (6Al-4V-Bal.Ti), the blade having been made in a closed die precision forging process but having a residual flashing at the edges, the removal of one being described hereafter. The airfoil is nominally $9\times3.2\times0.3$ cm in dimension, tapering at the edges and tip. The edge to be finished has a square-cut sheared appearance with the edge varying in thickness from about 1.15 to 0.06 mm, or by a ratio of 1.9 to 1. Prior to being placed in the electrolyte, the part has of course been descaled and pickled to remove any contamination from the forging operation. Immediately prior to being placed in the electrolyte, the part is typically degreased, rinsed in water, immersed in nitric-hydrofluoric acid for 10–20 seconds to remove any surface oxide, and then rinsed in cold water and dried. A shield of a thermoplastic masking compound is placed around the edge of the airfoil opposite that to be electrochemically milled to prevent stray currents and other adverse effects from the edge which may have been previously finished. The shield covers about 1.3 cm of the airfoil as measured from the opposing edge; it does not extend across the airfoil body to the point where the electrochemical action may cause a step on the airfoil at its point of termination.

The blade is mounted in a polyvinyl chloride support, together with an electrode, so that both are immersed within the electrolyte contained in a polypropylene tank. The electrolyte is preferably an ethylene glycol-sulfuric-hydrofluoric acid mixture having the preferred composition of Table I. Compositions within the range shown in the Table may also be used, as well as other glycol or alcohol base electrolytes as are known in the art. During electrochemical milling, the bath is preferably maintained between 25° and 32° C.

TABLE I

ELECTROLYTE COMPOSITION BY VOLUME PERCENT

| | Preferred | Range |
|---|---|---|
| Ethylene glycol | 77 | 75–79 |
| Conc. sulfuric acid | 13 | 11–15 |
| Conc. hydrofluoric acid | 10 | 8–12 |

An electrode having the configuration shown in either FIG. 3 or 4 is used. The dimensions of the A1S1 316 stainless steel electrode are: 8 mm diameter, tapering at a 1°20′ angle from its major axis. The electrode is nominally 9 cm long, about the same as the length of the leading edge, with the result that the minor diameter is nominally 4.6 mm inch. When a compound taper is added, the minor diameter or tip of the electrode is first reduced to about 3.2 mm and the electrode is expanded in diameter therefrom at an angle 5° from the major axis until the compound taper intersects the principal taper at a point which is nominally 13 mm from the tip. It might be noted that the ratio of the electrode major diameter to the proximate edge thickness is 8 mm/1.15 mm, or 7 to 1. The electrode is positioned in the support with the blade so that its nearest point, the major diameter surface, will be about 0.76 to 1.5 mm from the airfoil edge.

A source of electric potential is connected between the electrode and workpiece so that the electrode is the cathode and the workpiece is the anode. A power supply having a voltage output of about 50 volts is found satisfactory; current flow is initiated by applying the requisite voltage, then during operation the voltage is controlled to maintain the current at approximately 22 amps.

The electrode described has an area of about 12.3 sq. cm and the total area of the airfoil (excluding that which is masked), is about 41 sq. cm. Thus, at 22 amperes the average current density on the workpiece is about 0.5 amps per sq. cm while that on the electrode is 1.7. Of course, the current will not be evenly distributed across the areas of the electrode and workpiece, but will be concentrated at their proximate areas, as illustrated schematically in FIG. 6. Based on experience, it might be assumed that 75% of the current on the workpiece is concentrated within 0.5 mm of the edge; based on this, the average current density would be about 1.7 amps per square cm in the concentrated area, it still being understood that there is an unequal distribution within this area. Similarly, for the electrode, if it is assumed that 75% of the current passes through the front half of the cathode facing the edge, the average current density will be about 2.5 amps per sq. cm. The current densities mentioned above are only estimates.

At the 8 mm major diameter, the unit area for a 1 mm increment can be calculated to be 50 sq. mm while that at the 4.6 mm minor diameter on a single taper electrode can be calculated to be about 16.6 sq. mm. Thus, the ratio of the unit area from the base to the tip of the electrode is of the order of 3 to 1. (Of course, the special case of the compound angle tip is excluded from this calculation.)

As mentioned, the spacing distance between the electrode surface and the leading edge in proximity to the major diameter of the electrode is about 1.5 mm, the gap at the single taper electrode tip is therefore about 3.2 mm, and the ratio is therefore about 2 to 1.

The current is maintained between the electrode and workpiece for sufficient time to produce a finished product; typically this is about two minutes. When the current is terminated and the part is removed from the electrolyte, is will be found that the previously rough edge has been converted into a smooth radiused edge having a radius of about 0.12 inch at the tip end and about 0.18 inch radius at the base end of the airfoil.

Having thus described a typical embodiment of our invention, that which we claim as new and desire to secure by Letters Patent of the United States is:

1. The method of electrochemically milling the edge of a workpiece wherein different quantities of material must be removed from the workpiece edge at different locations along its length, characterized by providing a shaped electrode having a unit surface area A and spacing distance S between the electrode surface and the workpiece edge, as measured at points along the length of the electrode, wherein both A and S are changed so that the ratio of A/S is changed to lower values at points proximate to locations of the workpiece edge where less unit weight of material is removed.

2. In the method of electrochemically milling the edge of a thin workpiece where a portion of the edge has a thickness that varies along its length, the step of providing an electrode with a tapered portion, the electrode having its principal axis in nominal alignment with the edge so that the spacing distance between sub-portions of the tapered portion of the electrode and the proximate subportions of the workpiece edge are greater where the edge thickness is less, the electrode further having a unit surface area which decreases along the length of the edge in the same sense as the thickness of the edge decreases, to remove material in approximate proportion to the edge thickness and produce a well-finished edge.

3. Apparatus for electrochemically milling the edge of a thin workpiece wherein different quantities of material are removed from different points along a portion of the edge, comprising:

a workpiece having a thin edge;

a vessel for containing electrolyte;

an electrode having its principal axis in nominal alignment with the edge and having a taper portion, the [change in] taper being of a character such that the electrode unit surface area and the electrode spacing distance from the workpiece edge both vary *to thereby cause the ratio of said area to said distance to vary* in the same sense as the sense in which the quantity of material to be removed from the edge varies;

means for holding the electrode and the workpiece in fixed positions within the electrolyte;

means for applying an electric potential between the electrode and workpiece, sufficient to cause removal of material from the portion of the workpiece edge.

4. The apparatus in claim 3 wherein the workpiece is an airfoil having an edge sub-portion which terminates at a free intersecting surface and wherein the electrode is further characterized by having a compound taper, the compound taper being proximately located to the edge sub-portion.

5. The apparatus in claim 3 or 4 further characterized by a cylindrical tapered electrode and an airfoil workpiece, the electrode having its axis located nominally along the projections of the mean centerlines of the airfoil cross sections.

* * * * *